United States Patent
Yang (10) Patent No.: US 10,285,130 B2
(45) Date of Patent: May 7, 2019

(54) METHODS AND SYSTEMS OF SIGNAL GENERATION FOR AN ELECTRONIC DEVICE

(71) Applicant: Noodoe Corporation, Taipei (TW)

(72) Inventor: Chieh Yang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 100 days.

(21) Appl. No.: 15/365,988

(22) Filed: Dec. 1, 2016

(65) Prior Publication Data

US 2017/0215146 A1    Jul. 27, 2017

(30) Foreign Application Priority Data

Jan. 21, 2016   (TW) .............................. 105101818 A (51) Int. Cl.
*H04W 52/02* (2009.01)
*H04W 4/02* (2018.01)
*H04W 4/80* (2018.01)
*H04W 8/00* (2009.01)

(52) U.S. Cl.
CPC ....... *H04W 52/0251* (2013.01); *H04W 4/027* (2013.01); *H04W 4/80* (2018.02); *H04W 8/005* (2013.01); *Y02D 70/00* (2018.01); *Y02D 70/142* (2018.01); *Y02D 70/144* (2018.01); *Y02D 70/164* (2018.01); *Y02D 70/26* (2018.01)

(58) Field of Classification Search
CPC ... H04W 52/0251; H04W 4/80; H04W 8/005; H04W 4/027; Y02D 70/00; Y02D 70/26; Y02D 70/144; Y02D 70/142; Y02D 70/164
See application file for complete search history.

(56) References Cited

U.S. PATENT DOCUMENTS

| | | | | |
|---|---|---|---|---|
| 9,020,780 B2* | 4/2015 | Zhang | ..................... | G01P 1/127 702/141 |
| 2003/0030568 A1* | 2/2003 | Lastinger | ............. | G06K 7/0008 340/8.1 |
| 2006/0214806 A1* | 9/2006 | Clifford | ................ | A61B 5/1117 340/573.1 |
| 2010/0045519 A1* | 2/2010 | Lee | .......................... | G01S 19/34 342/357.57 |
| 2011/0043492 A1* | 2/2011 | Elsasser | .............. | G06F 3/03545 345/179 |
| 2011/0230791 A1* | 9/2011 | Ten Kate | ........... | G08B 21/0446 600/595 |
| 2016/0084615 A1* | 3/2016 | Allen | ...................... | F41A 33/02 250/201.1 |

FOREIGN PATENT DOCUMENTS

TW          200819968 A       5/2008

* cited by examiner

*Primary Examiner* — Alex Skripnikov
*Assistant Examiner* — Sharmin Chowdhury
(74) *Attorney, Agent, or Firm* — McClure, Qualey & Rodack, LLP (57) ABSTRACT

Methods and systems of signal generation for an electronic device are provided. First, a posture or a motion of an electronic device is detected by at least one sensor. It is determined whether the electronic device continuously moves in a predefined interval. When the electronic device does not continuously move in the predefined interval, a signal is generated. When the electronic device continuously moves in the predefined interval, a delay time is determined, and a signal is generated after the delay time.

8 Claims, 8 Drawing Sheets

METHODS AND SYSTEMS OF SIGNAL GENERATION FOR AN ELECTRONIC DEVICE

BACKGROUND OF THE INVENTION

Field of the Invention

The disclosure relates generally to signal generation methods and systems, and, more particularly to methods and systems that can determine a timing for generating a signal for an electronic device based on a movement state of the electronic device.

Description of the Related Art

Recently, electronic devices, such as smart phones, tablets, notebooks, and other portable devices, have become more and more technically advanced and multifunctional. For example, portable devices have network connectivity capabilities. Users can use their portable devices to connect to networks at anytime and anywhere. The convenience and new functionalities advanced by modern technology have made these devices into necessities of life.

Furthermore, with the coming of IOT (Internet Of Things) generation, every device or object can connect to networks, and users can access and control these devices or objects via networks. The rapid development of IOT is fortunate that the underlying foundation of wireless network technology is already very mature. Electronic devices can readily connect with each other to perform related applications via wireless networks. Additionally, the BLE (Bluetooth Low Energy) technology has solved the prohibitive power consumption issue caused by prolonged connections of electronic devices to wireless networks. For example, a beacon device is a low-cost wireless Bluetooth transmitter implemented with BLE technology, which can transmit Bluetooth signals via a wireless network for a long time. A mobile phone implemented with BLE technology can wirelessly seek Bluetooth signals to discover corresponding beacon device.

Currently, a large amount of innovative applications are developed using beacon devices. Since these devices always have a small and exquisite design, the applications face a common problem in which users frequently toy with these devices, thus causing these devices to be lost. Additionally, when users overly toy with these devices, function misjudgments of these devices may be increased, and system resources, such as power of these devices may be over consumed.

BRIEF SUMMARY OF THE INVENTION

Methods and systems of signal generation for an electronic device are provided, wherein a timing for generating a signal for an electronic device can be determined based on a movement state of the electronic device.

In an embodiment of a method of signal generation for an electronic device, a posture or a motion of an electronic device is detected by at least one sensor. It is determined whether the electronic device continuously moves in a predefined interval according to data detected by the sensor. When the electronic device does not continuously move in the predefined interval, a signal is generated. When the electronic device continuously moves in the predefined interval, a delay time is determined, and a signal is generated after the delay time.

An embodiment of a system of signal generation for an electronic device comprises at least one sensor and a controller. The sensor detects a posture or a motion of an electronic device. The controller determines whether the electronic device continuously moves in a predefined interval according to data detected by the sensor. When the electronic device does not continuously move in the predefined interval, the controller generates a signal. When the electronic device continuously moves in the predefined interval, the controller determines a delay time, and generates a signal after the delay time.

In some embodiments, the signal is generated according to a specific posture of the electronic device in a motionless state.

In some embodiments, the signal is broadcasted via a wireless network, wherein the signal comprises identification data corresponding to the electronic device, and motion information corresponding to a specific posture of the electronic device in a motionless state or specific data generated according to the motion information.

In some embodiments, when the sensor detects that the electronic device moves from a motionless state, the electronic device is driven to enter a first mode. After the signal is generated, the electronic device is driven to enter a second mode. The first mode and the second mode are different, and the power consumption of the electronic device in the second mode is less than that in the first mode.

In some embodiments, when the electronic device continuously moves in the predefined interval, a new predefined interval is waited from a time point at which the electronic device is motionless, and it is determined whether the electronic device continuously moves in the new predefined interval. When the electronic device continuously moves in the new predefined interval, a delay time is re-determined, and a signal is generated after the delay time.

In some embodiments, a movement time corresponding to the continuous movement of the electronic device in the predefined interval is calculated, and the delay time is determined according to the movement time.

In some embodiments, a number that the electronic device stays in at least one predefined posture in the predefined interval is calculated, and the delay time is determined according to the number.

In some embodiments, when the electronic device continuously moves in the predefined interval, a warning notification is generated.

Methods of signal generation for an electronic device may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and system of signal generation for an electronic device are provided.

Figure 1:
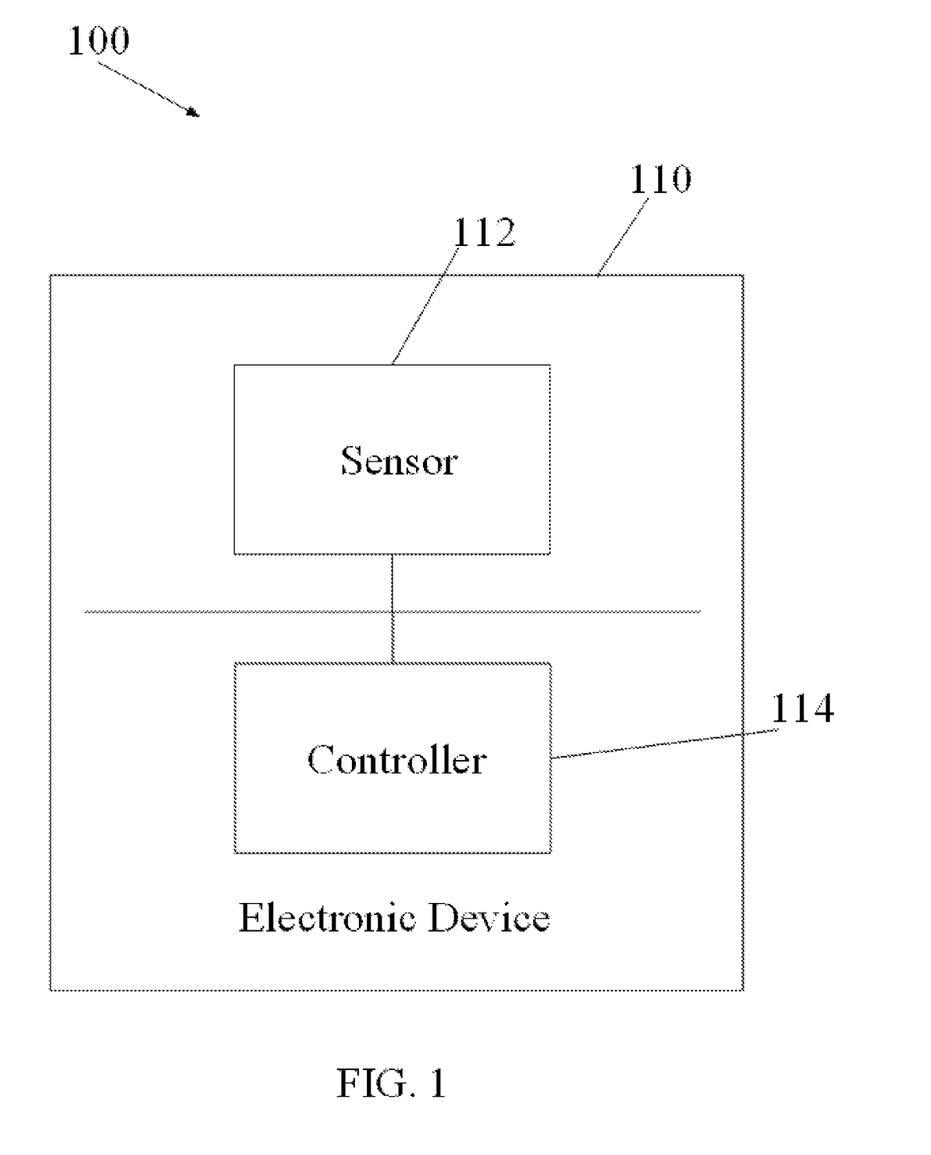
FIG. 1 is a schematic diagram illustrating an embodiment of a system of signal generation for an electronic device of the invention.

FIG. 1 is a schematic diagram illustrating an embodiment of a system of signal generation for an electronic device of the invention. The system of signal generation for an electronic device 100 can be used in an electronic device 110, such as a computer or a portable device, such as a mobile phone, a smart phone, a PDA, a GPS, a notebook, a tablet computer, or a wearable electronic device. As shown in FIG. 1, the electronic device 110 comprises a sensor 112 and a controller 114. The sensor 112 can detect a posture and/or motion corresponding to the electronic device 110, and accordingly generating motion information. It is understood that, in some embodiments, the sensor 112 may be an accelerometer for generating information of velocity and displacement when the device moves. In some embodiments, the sensor 112 may be a Gyro sensor for generating information of angular acceleration when the device moves. It is noted that, the above sensors are only examples of the present application, and the present invention is not limited thereto. Any sensor that can detect the posture and/or motion of an electronic device can be applied in the present invention. The controller 114 can control related operations of hardware and software in the electronic device 110, and perform the methods of signal generation for an electronic device of the present invention, which will be discussed later. It is understood that, in some embodiments, the electronic device 110 can comprise a sound out unit (not shown in FIG. 1) for outputting sounds. In some embodiments, the electronic device 110 can comprise a vibration unit (not shown in FIG. 1) for generating vibrations.

Figure 2:
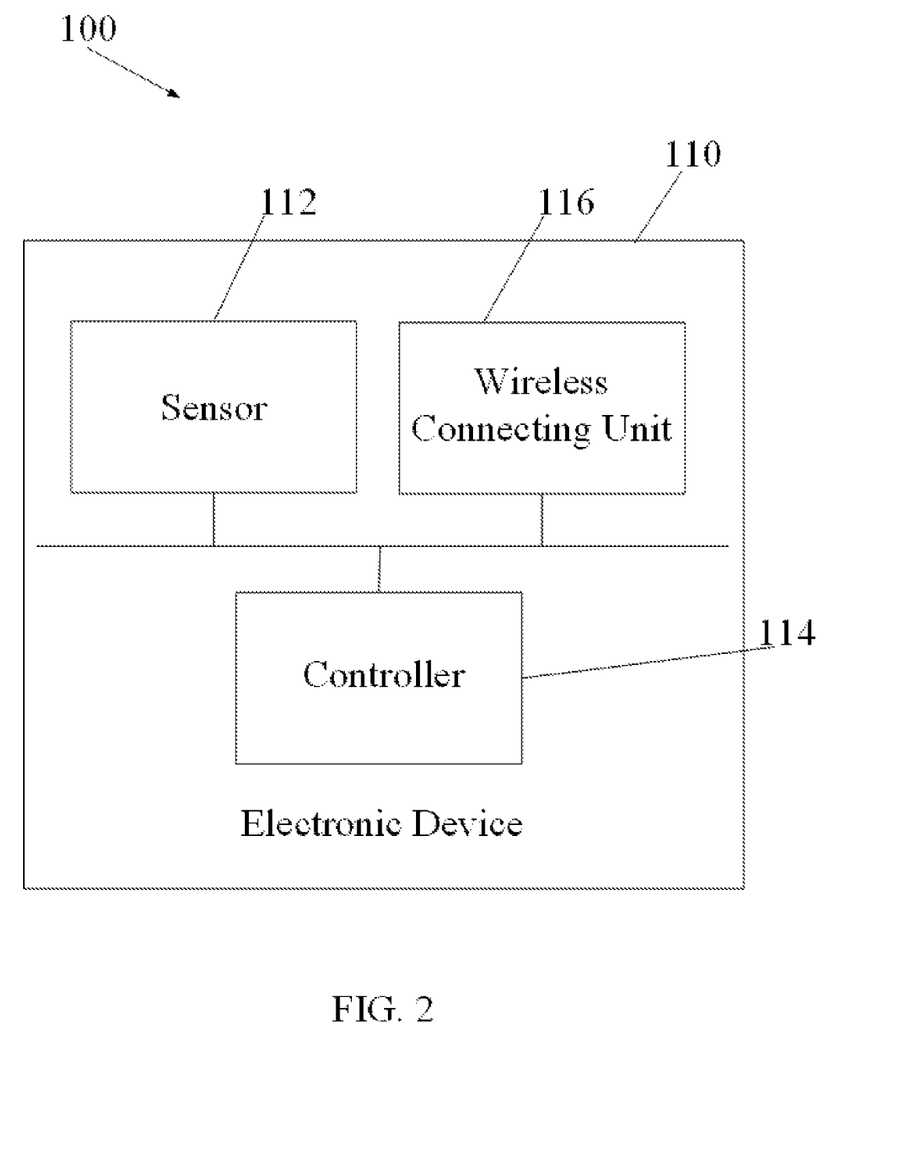
FIG. 2 is a schematic diagram illustrating another embodiment of a system of signal generation for an electronic device of the invention.

FIG. 2 is a schematic diagram illustrating another embodiment of a system of signal generation for an electronic device of the invention. The system of signal generation for an electronic device 100 can be used in an electronic device 110, such as a computer or a portable device, such as a mobile phone, a smart phone, a PDA, a GPS, a notebook, a tablet computer, or a wearable electronic device. As shown in FIG. 2, the electronic device 110 comprises a sensor 112, a controller 114, and a wireless connecting unit 116. Similarly, the sensor 112 can detect a posture and/or motion corresponding to the electronic device 110, and accordingly generating motion information. It is understood that, in some embodiments, the sensor 112 may be an accelerometer for generating information of velocity and displacement when the device moves. In some embodiments, the sensor 112 may be a Gyro sensor for generating information of angular acceleration when the device moves. It is noted that, the above sensors are only examples of the present application, and the present invention is not limited thereto. Any sensor that can detect the posture and/or motion of an electronic device can be applied in the present invention. Similarly, the controller 114 can control related operations of hardware and software in the electronic device 110, and perform the methods of signal generation for an electronic device of the present invention, which will be discussed later.

The wireless connecting unit 116 can wirelessly receive and/or transmit signals. In some embodiments, the wireless connecting unit 116 can be a radio transceiver for broadcasting or receiving data in a specific frequency range, such as VHF or UHF. In some embodiments, the wireless connecting unit 116 can transmit and receive data via a wireless network, such as a Wi-Fi or a Bluetooth network, and/or connect to any electronic device having wireless network connecting capabilities. It is understood that, in some embodiments, the wireless connecting unit 116 may be a network connecting unit implemented with a low-power consumption technology, such as Bluetooth Smart technology. The network connecting unit has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. It is understood that, in some embodiments, the electronic device 110 can comprise a sound out unit (not shown in FIG. 1) for outputting sounds. In some embodiments, the electronic device 110 can comprise a vibration unit (not shown in FIG. 1) for generating vibrations.

Figure 3:
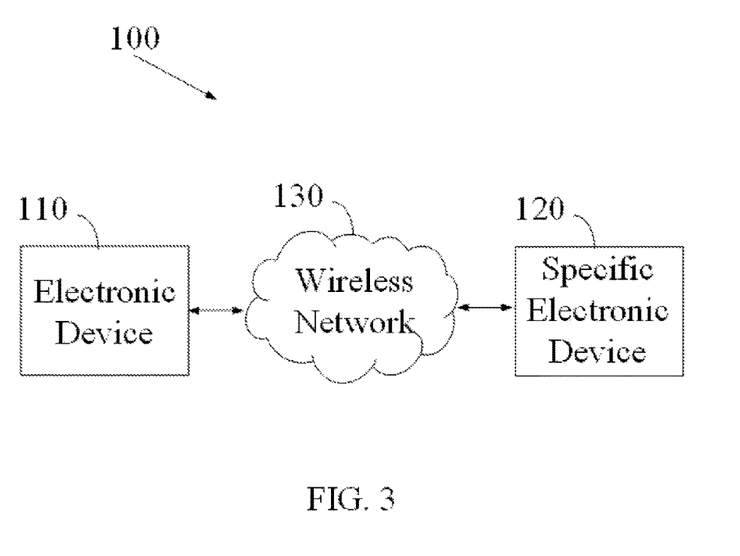
FIG. 3 is a schematic diagram illustrating another embodiment of a system of signal generation for an electronic device of the invention.

FIG. 3 is a schematic diagram illustrating another embodiment of a system of signal generation for an electronic device of the invention. The system of signal generation for an electronic device 100 comprises an electronic device 110 and a specific electronic device 120. In some embodiments, the electronic device 110 may be a computer or a portable device, such as a mobile phone, a smart phone, a PDA, a GPS, a notebook, a tablet computer, or a wearable electronic device. In some embodiments, the electronic device 110 can broadcast generated signals via a wireless network 130, such as a Wi-Fi or a Bluetooth network, and the specific electronic device 120 can receive the signals broadcasted by the electronic device 110 via the wireless network 130.

Figure 4:
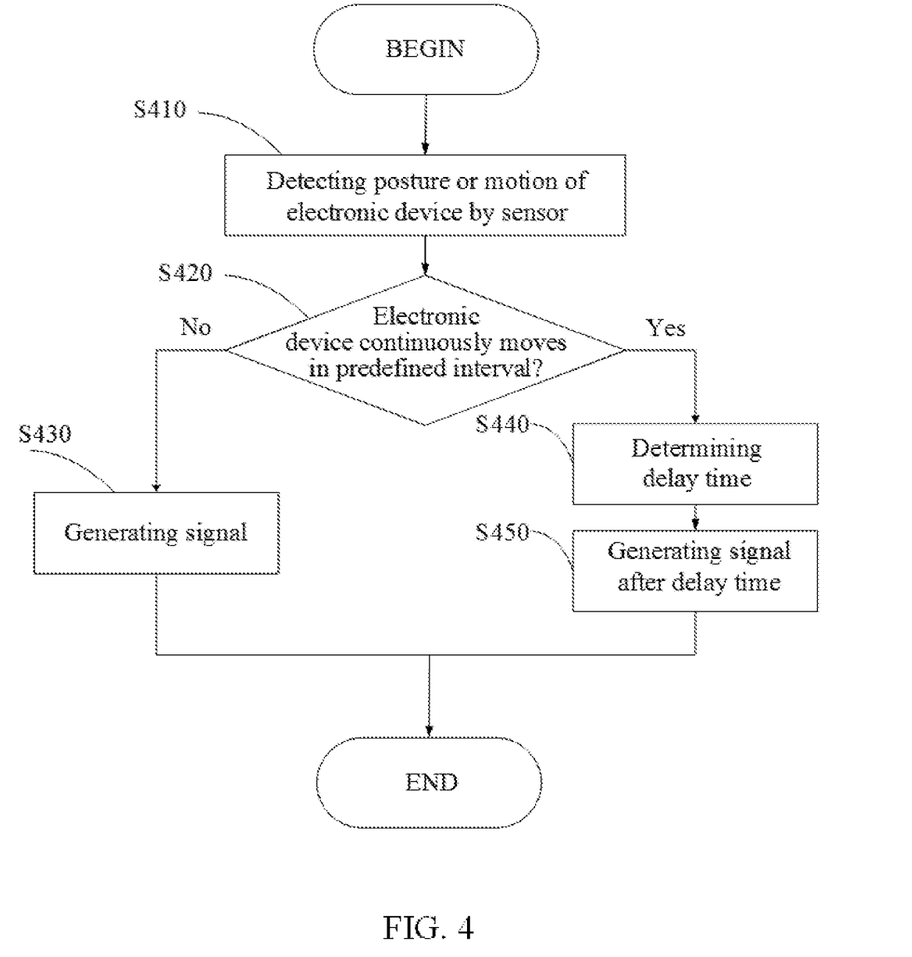
FIG. 4 is a flowchart of an embodiment of a method of signal generation for an electronic device of the invention.

FIG. 4 is a flowchart of an embodiment of a method of signal generation for an electronic device of the invention. The method of signal generation for an electronic device can be used in an electronic device, such as a computer or a portable device, such as a mobile phone, a smart phone, a PDA, a GPS, a notebook, a tablet computer, or a wearable electronic device.

In step S410, a posture or a motion of an electronic device is detected by at least one sensor. It is understood that, in some embodiments, the sensor may be an accelerometer for generating information of velocity and displacement when the device moves. In some embodiments, the sensor may be a Gyro sensor for generating information of angular acceleration when the device moves. It is noted that, the above sensors are only examples of the present application, and the present invention is not limited thereto. Any sensor that can detect the posture and/or motion of an electronic device can be applied in the present invention. In step S420, it is determined whether the electronic device continuously moves in a predefined interval according to data detected by the sensor. When the electronic device does not continuously move in the predefined interval (No in step S420), in step S430, the electronic device generates a signal. When the electronic device continuously moves in the predefined interval (Yes in step S420), in step S440, a delay time is determined, and in step S450, the electronic device generates a signal after the delay time. It is understood that, in some embodiments, the signal is generated according to a specific posture of the electronic device in a motionless state.

It is understood that, in some embodiments, the electronic device comprises a first mode and a second mode. When the sensor detects that the electronic device moves from a motionless state, the electronic device is driven to enter the first mode, and generate a signal in the first mode. After the signal is generated, the electronic device is driven to enter the second mode. The first mode and the second mode are different, and the power consumption of the electronic device in the second mode is less than that in the first mode. Further, in some embodiments, when the electronic device continuously moves in the predefined interval, a warning notification is generated. The warning notification may be sounds or vibrations.

Figure 5:
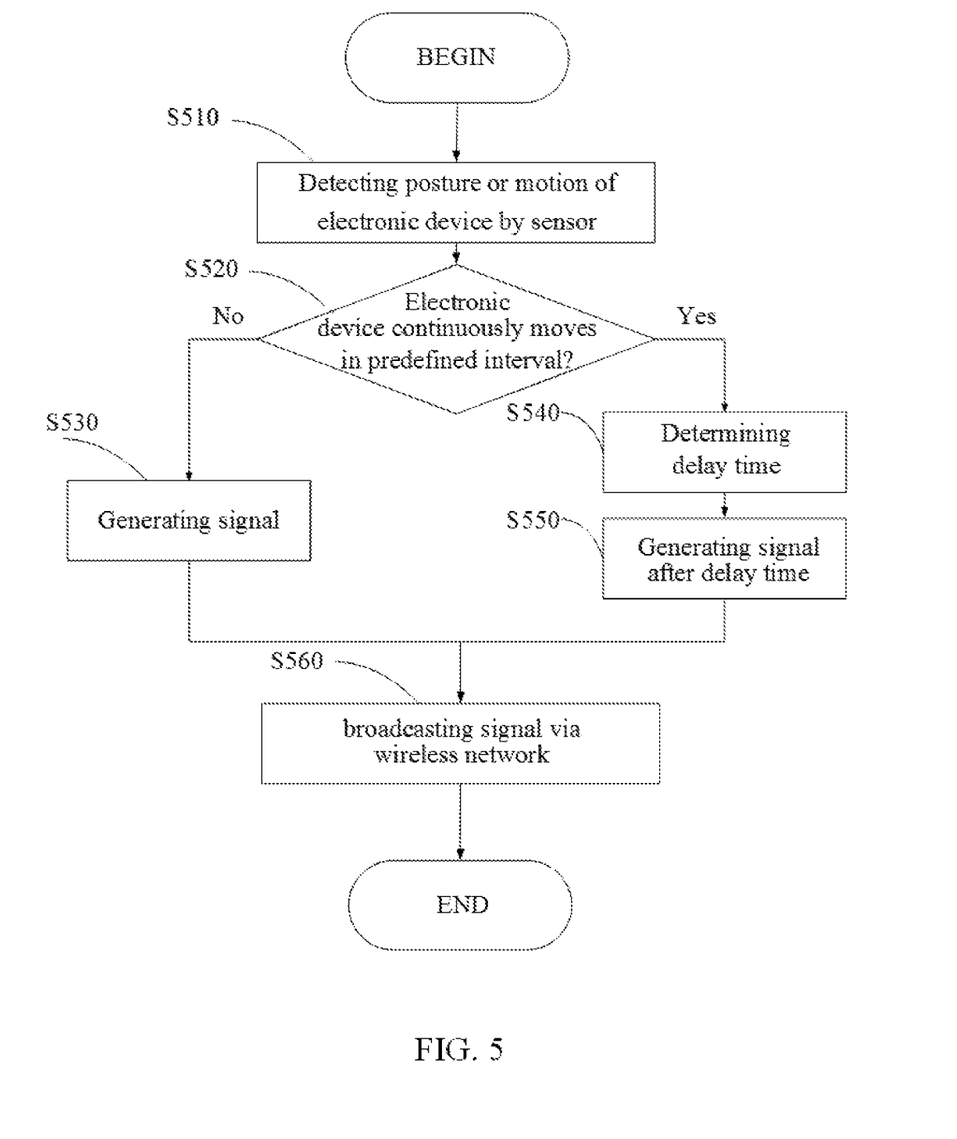
FIG. 5 is a flowchart of another embodiment of a method of signal generation for an electronic device of the invention.

FIG. 5 is a flowchart of another embodiment of a method of signal generation for an electronic device of the invention. The method of signal generation for an electronic device can be used in an electronic device, such as a computer or a portable device, such as a mobile phone, a smart phone, a PDA, a GPS, a notebook, a tablet computer, or a wearable electronic device.

In step S510, a posture or a motion of an electronic device is detected by at least one sensor. Similarly, in some embodiments, the sensor may be an accelerometer for generating information of velocity and displacement when the device moves. In some embodiments, the sensor may be a Gyro sensor for generating information of angular acceleration when the device moves. It is noted that, the above sensors are only examples of the present application, and the present invention is not limited thereto. Any sensor that can detect the posture and/or motion of an electronic device can be applied in the present invention. In step S520, it is determined whether the electronic device continuously moves in a predefined interval according to data detected by the sensor. When the electronic device does not continuously move in the predefined interval (No in step S520), in step S530, the electronic device generates a signal. When the electronic device continuously moves in the predefined interval (Yes in step S520), in step S540, a delay time is determined, and in step S550, the electronic device generates a signal after the delay time. It is understood that, in some embodiments, the signal is generated according to a specific posture of the electronic device in a motionless state. Then, in step S560, the generated signal is wirelessly broadcasted. It is understood that, in some embodiments, the signal comprises identification data corresponding to the electronic device, and motion information corresponding to a specific posture of the electronic device in a motionless state or specific data generated according to the motion information. It is noted that, the electronic device can broadcast the generated signal via a wireless connecting unit. In some embodiments, the generated signal can be broadcasted in a specific frequency range, such as VHF or UHF via a radio transceiver. In some embodiments, the wireless connecting unit may be a network connecting unit implemented with a low-power consumption technology, such as Bluetooth Smart technology. As described, the network connecting unit has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the wireless connecting unit of the electronic device wirelessly broadcasts the generated signal in the peripheral mode.

Similarly, in some embodiments, the electronic device comprises a first mode and a second mode. When the sensor detects that the electronic device moves from a motionless state, the electronic device is driven to enter the first mode, and generate a signal in the first mode. After the signal is generated and broadcasted, the electronic device is driven to enter the second mode. The first mode and the second mode are different, and the power consumption of the electronic device in the second mode is less than that in the first mode. Further, in some embodiments, when the electronic device continuously moves in the predefined interval, a warning notification is generated. The warning notification may be sounds or vibrations.

Figure 6:
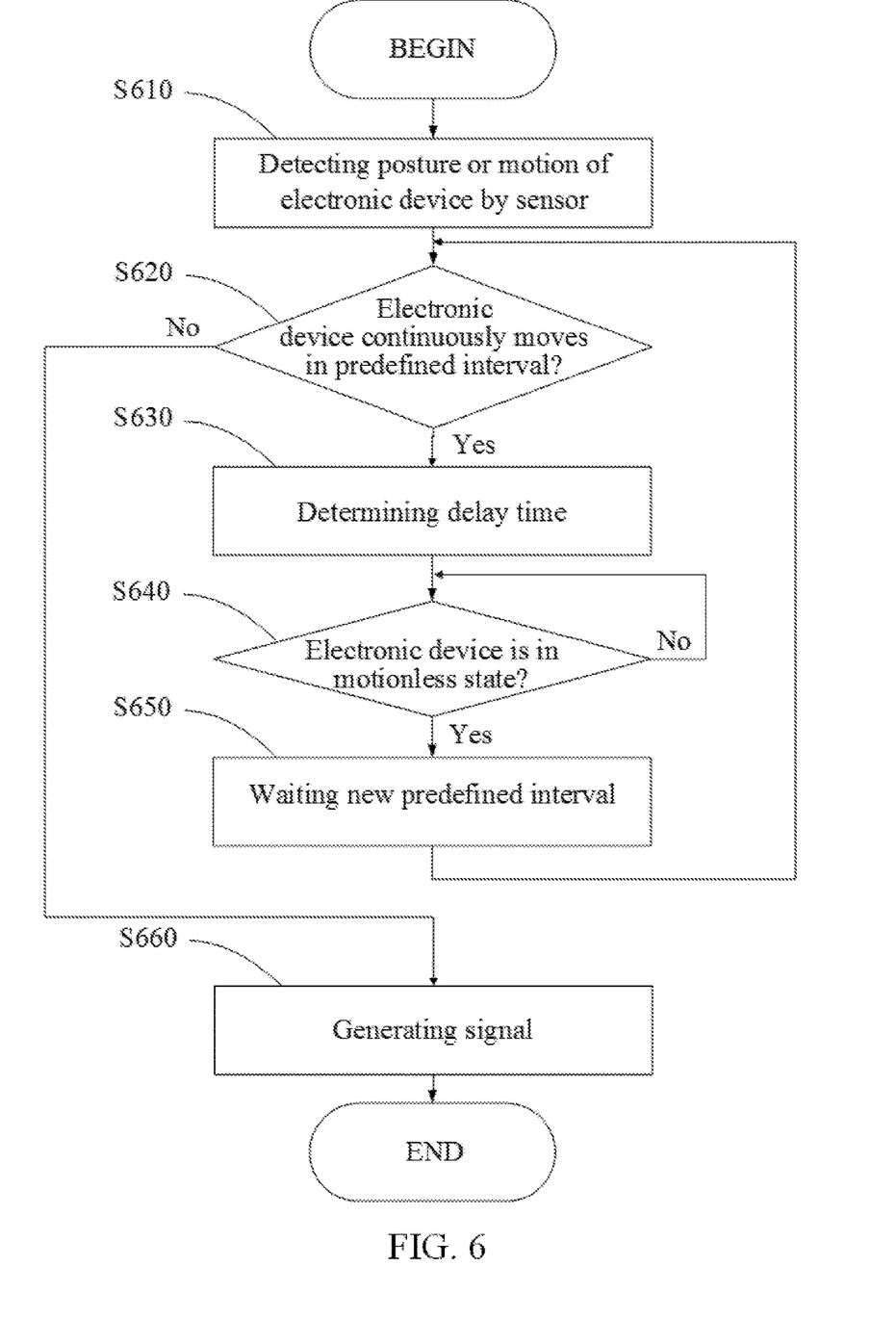
FIG. 6 is a flowchart of another embodiment of a method of signal generation for an electronic device of the invention.

FIG. 6 is a flowchart of another embodiment of a method of signal generation for an electronic device of the invention. The method of signal generation for an electronic device can be used in an electronic device, such as a computer or a portable device, such as a mobile phone, a smart phone, a PDA, a GPS, a notebook, a tablet computer, or a wearable electronic device.

In step S610, a posture or a motion of an electronic device is detected by at least one sensor. Similarly, in some embodiments, the sensor may be an accelerometer for generating information of velocity and displacement when the device moves. In some embodiments, the sensor may be a Gyro sensor for generating information of angular acceleration when the device moves. It is noted that, the above sensors are only examples of the present application, and the present invention is not limited thereto. Any sensor that can detect the posture and/or motion of an electronic device can be applied in the present invention. In step S620, it is determined whether the electronic device continuously moves in a predefined interval according to data detected by the sensor. When the electronic device does not continuously move in the predefined interval (No in step S620), in step S660, the electronic device generates a signal. It is understood that, in some embodiments, the signal is generated according to a specific posture of the electronic device in a motionless state. When the electronic device continuously moves in the predefined interval (Yes in step S620), in step S630, a delay time is determined, and in step S640, it is determined whether the electronic device is in a motionless state according to the data detected by the sensor. When the electronic device is not in a motionless state (No in step S640), the procedure remains at step S640. When the electronic device is in a motionless state (Yes in step S640), in step S650, a new predefined interval is waited from a time point at which the electronic device is motionless. Then, the procedure returns to step S620, and in step S620, it is determined whether the electronic device continuously moves in the new predefined interval. It is noted that, when the electronic device continuously moves in the new predefined interval, a delay time is re-determined. When the electronic device does not continuously move in the new predefined interval, the electronic device generates a signal.

Similarly, in some embodiments, the electronic device comprises a first mode and a second mode. When the sensor detects that the electronic device moves from a motionless state, the electronic device is driven to enter the first mode, and generate a signal in the first mode. After the signal is generated, the electronic device is driven to enter the second mode. The first mode and the second mode are different, and the power consumption of the electronic device in the second mode is less than that in the first mode. Further, in some embodiments, when the electronic device continuously moves in the predefined interval, a warning notification is generated. The warning notification may be sounds or vibrations.

In some embodiments, a table can be provided in the electronic device, wherein the table records a delay time corresponding to respective predefined intervals. For example, when the electronic device continuously moves in the first predefined interval, the corresponding delay time is 3 seconds. When the electronic device continuously moves in the second predefined interval, the corresponding delay time is 5 seconds. When the electronic device continuously moves in the third predefined interval, the corresponding delay time is 8 seconds. The electronic device can determine a delay time by looking up the table.

Figure 7:
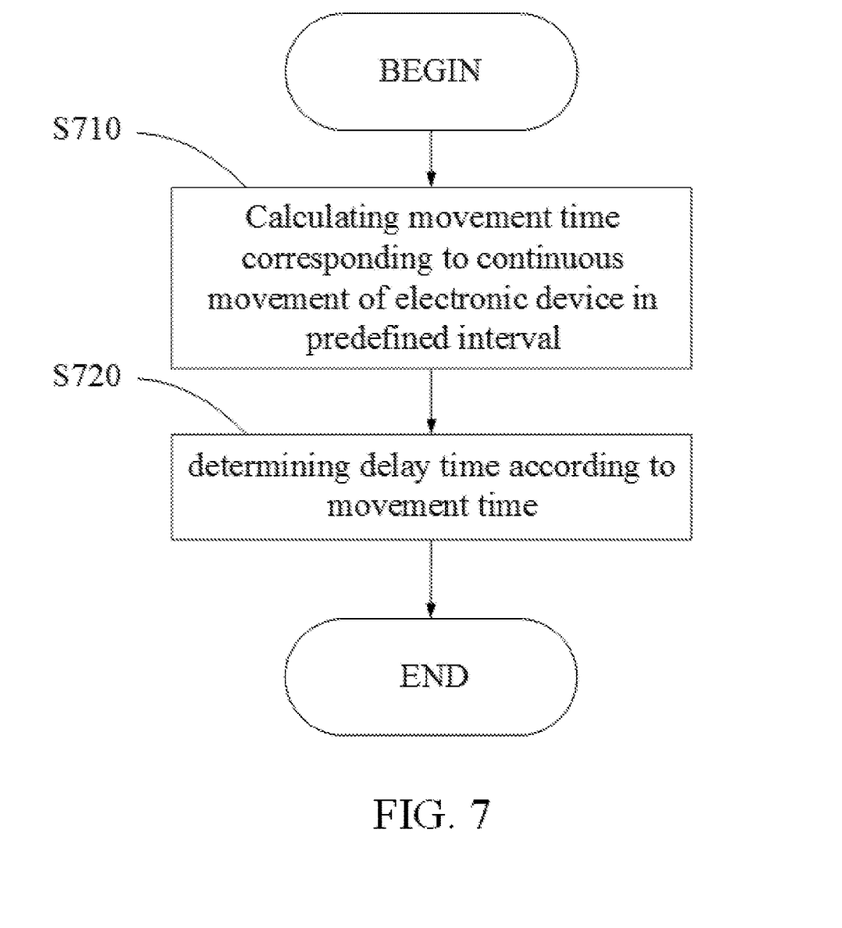
FIG. 7 is a flowchart of an embodiment of a method for determining a delay time of the invention.
Figure 8:
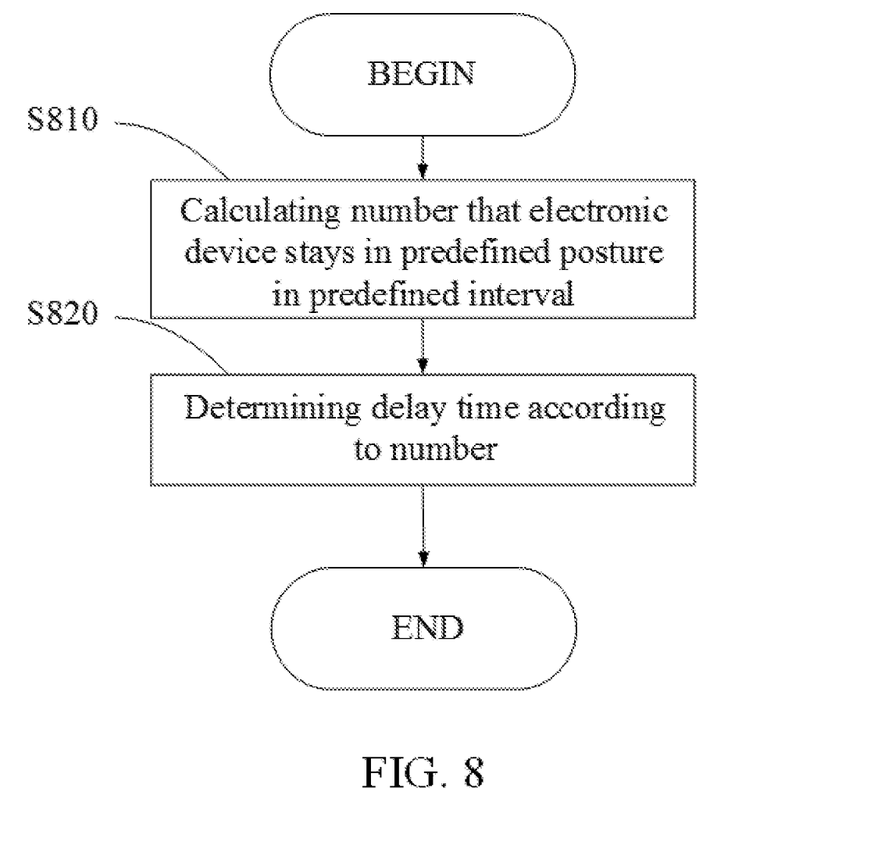
FIG. 8 is a flowchart of another embodiment of a method for determining a delay time of the invention.

It is noted that, any manner for determining a delay time can be applied in the present invention. FIG. 7 is a flowchart of an embodiment of a method for determining a delay time of the invention. In step S710, a movement time corresponding to the continuous movement of the electronic device in the predefined interval is calculated. In step S720, a delay time is determined according to the movement time. In some embodiments, the movement time is directly proportional to the delay time. For example, when the movement time corresponding to the continuous movement of the electronic device in the predefined interval is longer, the delay time is longer. FIG. 8 is a flowchart of another embodiment of a method for determining a delay time of the invention. In step S810, a number that the electronic device stays in at least one predefined posture in the predefined interval is calculated. In step S820, a delay time is determined according to the number. In some embodiments, the number that the electronic device stays in at least one predefined posture in the predefined interval is directly proportional to the delay time. For example, when the number that the electronic device stays in at least one predefined posture in the predefined interval is more, the delay time is longer. It is noted again, above manners for determining a delay time are only examples of the present application, and the invention is not limited thereto. Any manner for determining a delay time can be applied in the present invention.

As described, a specific electronic device can wirelessly receive the signals broadcasted by the electronic device. In some embodiments, the specific electronic device can retrieve a specific management content from a plurality of management contents according to data in the received signal. It is noted that, the data in the signal can comprise motion information of an electronic device which transmitting the signal, or specific data generated based on the motion information of the electronic device which transmitting the signal. It is understood that, in some embodiments, the specific electronic device can have a table for recording the corresponding relationship between the data in the signal and the management contents. The specific electronic device can retrieve a corresponding management content from the table according to the data in the received signal, and presents the retrieved specific management content. It is understood that, in some embodiments, the specific management content can be displayed via a display unit of the specific electronic device. In some embodiments, the specific management content can be generated and output via a sound output unit of the specific electronic device. It is noted that, above presentation manners for the specific management content are examples of the application, and the present invention is not limited thereto.

Therefore, the methods and system of signal generation for an electronic device of the present invention can determine a timing for generating a signal for an electronic device based on a movement state of the electronic device, thereby avoiding the occurrence of function misjudgments, and reducing the consumption and waste of device resources, such as power.

Methods of signal generation for an electronic device, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method of signal generation for an electronic device for use in an electronic device, comprising:
    detecting a posture or a motion of the electronic device by at least one sensor;
    determining whether the electronic device continuously moves in a predefined interval according to data detected by the sensor;
    when the electronic device does not continuously move in the predefined interval, generating a signal;
    when the electronic device continuously moves in the predefined interval, calculating a number of times that the electronic device stays in at least one predefined posture in the predefined interval, determining a delay time according to the number of times that the electronic device stays in the at least one predefined posture in the predefined interval, and generating the signal after the delay time;
    when the sensor detects that the electronic device moves from a motionless state, driving the electronic device to enter a first mode; and
    after the signal is generated, driving the electronic device to enter a second mode,
    wherein the first mode and the second mode are different, and power consumption of the electronic device in the second mode is less than that in the first mode.

2. The method of claim 1, wherein the signal is generated according to a specific posture of the electronic device in a motionless state.

3. The method of claim 1, further comprising broadcasting the signal via a wireless network, wherein the signal comprises identification data corresponding to the electronic device, and motion information corresponding to a specific posture of the electronic device in a motionless state or specific data generated according to the motion information.

4. The method of claim 1, further comprising:
when the electronic device continuously moves in the predefined interval, waiting a new predefined interval from a time point at which the electronic device is motionless, and determining whether the electronic device continuously moves in the new predefined interval; and
when the electronic device continuously moves in the new predefined interval, re-determining a delay time, and generating a signal after the delay time.

5. The method of claim 1, further comprising calculating a movement time corresponding to the continuous movement of the electronic device in the predefined interval, and determining the delay time according to the movement time.

6. The method of claim 1, further comprising generating a warning notification when the electronic device continuously moves in the predefined interval.

7. A system of signal generation for an electronic device for use in an electronic device, comprising:
at least one sensor detecting a posture or a motion of the electronic device by at least one sensor; and
a controller determining whether the electronic device continuously moves in a predefined interval according to data detected by the sensor, generating a signal when the electronic device does not continuously move in the predefined interval, and when the electronic device continuously moves in the predefined interval, calculating a number of times that the electronic device stays in at least one predefined posture in the predefined interval, determining a delay time according to the number of times that the electronic device stays in the at least one predefined posture in the predefined interval, generating the signal after the delay time, when the sensor detects that the electronic device moves from a motionless state, driving the electronic device to enter a first mode, and after the signal is generated, driving the electronic device to enter a second mode,
wherein the first mode and the second mode are different, and power consumption of the electronic device in the second mode is less than that in the first mode.

8. A machine-readable non-transitory storage medium comprising a computer program, which, when executed, causes a device to perform a method of signal generation for an electronic device for use in an electronic device, wherein the method comprises:
detecting a posture or a motion of the electronic device by at least one sensor;
determining whether the electronic device continuously moves in a predefined interval according to data detected by the sensor;
when the electronic device does not continuously move in the predefined interval, generating a signal;
when the electronic device continuously moves in the predefined interval, calculating a number of times that the electronic device stays in at least one predefined posture in the predefined interval, determining a delay time according to the number of times that the electronic device stays in the at least one predefined posture in the predefined interval, and generating the signal after the delay time,
when the sensor detects that the electronic device moves from a motionless state, driving the electronic device to enter a first mode; and
after the signal is generated, driving the electronic device to enter a second mode,
wherein the first mode and the second mode are different, and power consumption of the electronic device in the second mode is less than that in the first mode.

* * * * *